(12) United States Patent
Rodrigues Freire Neto et al.

(10) Patent No.: US 11,585,464 B2
(45) Date of Patent: Feb. 21, 2023

(54) INCORPORATING STRUCTURES INTO REELED PIPELINES

(71) Applicant: Subsea 7 do Brasil Servicos Ltda, Niteroi (BR)

(72) Inventors: Irio Rodrigues Freire Neto, Niteroi (BR); Daniel Sahonero Rodrigues, Rio de Janeiro (BR)

(73) Assignee: Subsea 7 do Brasil Servicos Ltda, Niteroi (BR)

( * ) Notice: Subject to any disclaimer, the term of this patent is extended or adjusted under 35 U.S.C. 154(b) by 0 days.

(21) Appl. No.: 17/413,916

(22) PCT Filed: Dec. 13, 2019

(86) PCT No.: PCT/BR2019/050538
§ 371 (c)(1),
(2) Date: Jun. 14, 2021

(87) PCT Pub. No.: WO2020/118404
PCT Pub. Date: Jun. 18, 2020

(65) Prior Publication Data
US 2022/0042624 A1    Feb. 10, 2022

(30) Foreign Application Priority Data

Dec. 14, 2018 (GB) ..................................... 1820441

(51) Int. Cl.
*F16L 1/20* (2006.01)
*F16L 55/38* (2006.01)
(Continued)

(52) U.S. Cl.
CPC .............. *F16L 1/203* (2013.01); *F16L 1/207* (2013.01); *F16L 55/38* (2013.01); *F16L 55/46* (2013.01); *F16L 57/02* (2013.01); *F16L 2101/20* (2013.01)

(58) Field of Classification Search
CPC ....... F16L 1/203; F16L 1/207; F16L 2101/20; F16L 55/38; F16L 55/46
See application file for complete search history.

(56) References Cited

U.S. PATENT DOCUMENTS 10,544,881 B2   1/2020  Chalmers et al.
10,864,911 B2  12/2020  Chalmers et al.

FOREIGN PATENT DOCUMENTS

GB         2553837      3/2018
WO    WO 2008/072970    6/2008
(Continued)

OTHER PUBLICATIONS

DNV-GL Standard DNVGL-ST-F101, "Submarine pipeline systems," Oct. 2017.
(Continued)

*Primary Examiner* — Sean D Andrish
(74) *Attorney, Agent, or Firm* — Levy & Grandinetti

(57) ABSTRACT

In a method of joining a structure to a water-filled pipeline aboard a reel-lay vessel, a trailing end portion of the pipeline is suspended upright on a reel-lay tower. Water is drained from the trailing end portion while being retained in an inclined portion of the pipeline extending from the tower to a reel of the vessel and in a spooled portion of the pipeline coiled on the reel. The structure is joined to a trailing end of the pipeline after inserting a pig into the trailing end portion through the trailing end. Pumping additional water into a leading end of the pipeline on the reel propels the pig from the trailing end portion into a conduit of the structure while flooding the trailing end portion. This expels air through a port of the structure that was trapped in the trailing end portion between the pig and the structure.

18 Claims, 14 Drawing Sheets

(51) Int. Cl.
   *F16L 55/46*   (2006.01)
   *F16L 57/02*   (2006.01)
   *F16L 101/20*  (2006.01)

(56) References Cited

FOREIGN PATENT DOCUMENTS

| WO | WO 2010/010390 | 1/2010 |
| WO | WO 2011/051218 | 5/2011 |
| WO | WO 2018/051190 | 3/2018 |
| WO | WO 2018/051191 | 3/2018 |

OTHER PUBLICATIONS

American Petroleum Institute API Specification 5L, "Specification for Line Pipe," Jul. 2013 (45th ed.).
ASME Publication B31.3, "Process Piping," 2020.

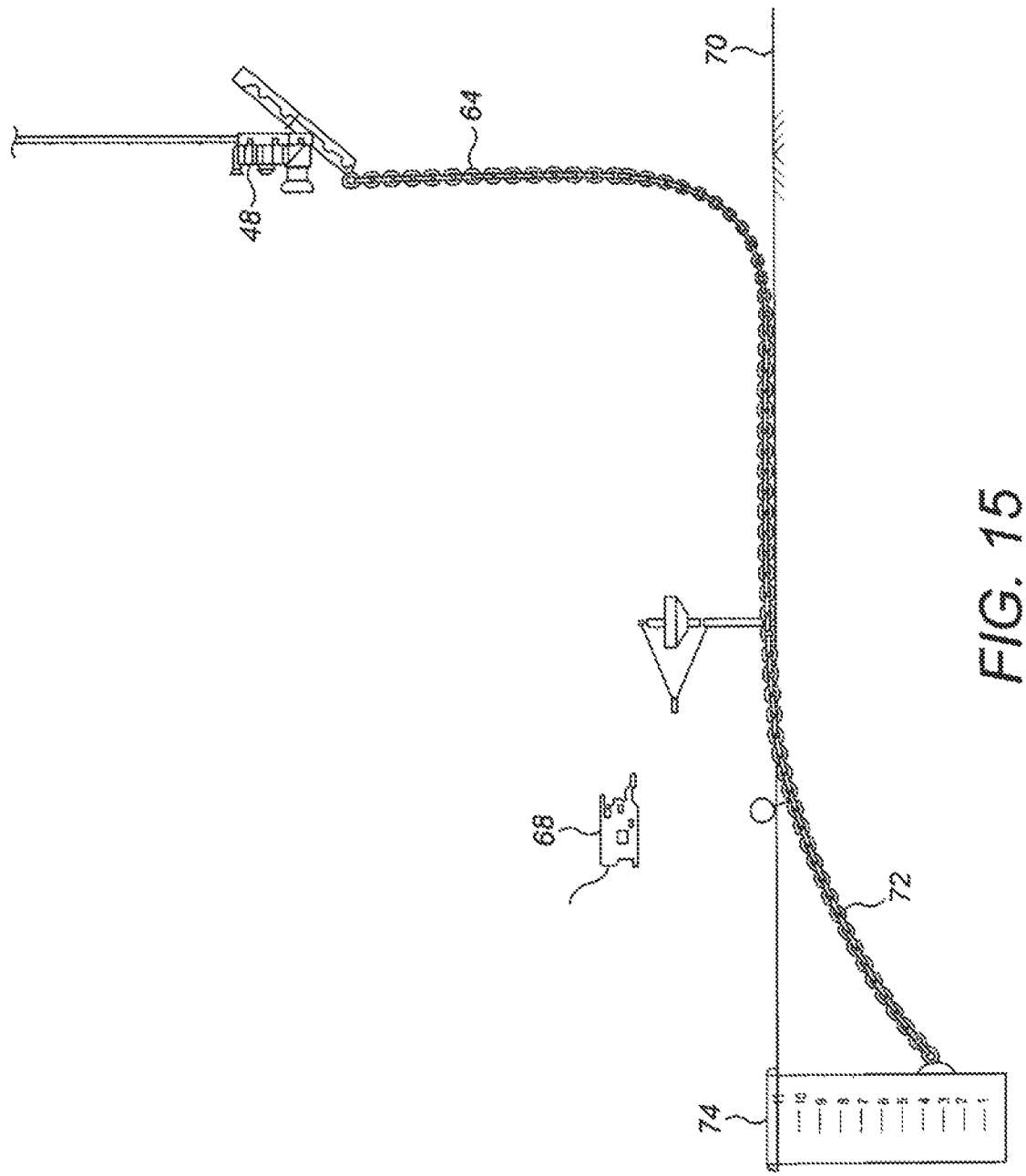

INCORPORATING STRUCTURES INTO REELED PIPELINES

BACKGROUND OF THE INVENTION

This invention addresses the challenges of incorporating structures such as pipeline accessories into pipelines filled with a pressurising fluid such as water. The main application of the invention is the offshore installation of mechanically-lined pipeline by the reel-lay method, in which the pipeline is spooled for transport and unspooled for installation.

Reel-lay operations involve winding or spooling a continuous pipe formed of welded elements onto a reel of a dedicated pipelaying vessel, to be unwound or unspooled subsequently during pipelaying at sea. The vessel comprises at least one transport reel and a lay tower or ramp that comprises a straightener and various guides to guide the pipeline into the sea after unspooling and straightening.

From time to time, a pipeline accessory, which typically comprises a valve and/or a connector supported by a structure, has to be incorporated into and installed with a reeled pipeline.

A conventional method to incorporate a pipeline end accessory into a reeled pipeline, such as a pipeline end termination (PLET) or a pig launcher/receiver, involves spooling the length of pipeline required until the accessory and then welding the structure of the accessory to an end of the pipeline.

It can be convenient to spool longer pipelines in order to reduce the number of trips that a reel-lay vessel has to make between a coastal loading quay and an offshore installation site. A longer pipeline such as this may require accessories to be installed not only at the ends of the pipeline but also in-line at intermediate locations along the pipeline. In that case, the pipeline is cut at a workstation in the tower, after the straightener, and the accessory structure is welded between the cut ends of the pipeline.

Similarly, it can be convenient for a reel-lay vessel to carry first and second pipelines spooled in series on the same reel if the capacity of the reel is sufficient. A transition joint effects the transition between successively-reeled pipelines that have different characteristics, such as different diameters. The transition joint is cut out before abandoning the upper end of the first pipeline to the seabed and then initiating the installation of the second pipeline. Pipeline end accessories may be added to the cut end of either or both of the pipelines.

Nominally rigid pipes have enough flexibility to be bent if a minimum bend radius is observed. When spooling, bending extends beyond elastic limits into plastic deformation of the pipe that must be recovered by subsequent straightening processes during laying.

Bending deformation of a pipe upon spooling and unspooling develops considerable stresses and strains in the pipe wall, including ovalisation in transverse cross-section.

Particular problems arise when bending a lined pipe, which may be required for handling well fluids containing corrosive agents such as hydrogen sulphide and chlorides.

A lined pipe typically comprises a load-bearing, thick-walled, high-strength, outer pipe of low-alloy carbon steel, lined with a thin-walled liner sleeve of a corrosion-resistant alloy (CRA). Plastics liner sleeves are also known. The outer pipe resists buckling during spooling and unspooling and resists hydrostatic pressure when underwater. Conversely, the inner sleeve provides little mechanical strength, being just a few millimetres thick, but it protects the outer pipe from corrosive constituents of fluids carried by the pipe in use.

The use of two different materials in this way recognises that a pipe made entirely from corrosion-resistant material would be prohibitively expensive and yet could lack the essential mechanical properties that are provided by the strong outer wall of a lined pipe.

CRA-lined bimetallic pipes take two forms. The first is 'clad' pipe, in which an internal CRA liner sleeve is metallurgically bonded to the outer pipe. The second is 'mechanically lined pipe' or 'MLP', in which an interference fit between the liner sleeve and the outer pipe fixes the liner sleeve without metallurgical bonding. An example of MLP is supplied by H. Butting GmbH & Co. KG of Germany under the trade mark 'BuBi'.

To produce a length of MLP, a tubular liner sleeve is inserted telescopically into an outer pipe as a sliding fit and both are expanded radially by internal hydraulic pressure applied to the liner sleeve. The expanding liner sleeve undergoes radially-outward plastic deformation to apply radial expansion force to the outer pipe, which undergoes radially-outward plastic or elastic deformation as a result. Once the internal pressure is relaxed, radially-inward elastic shrinkage of the outer pipe onto the plastically-expanded liner sleeve effects a mechanical bond between the outer pipe and the liner sleeve.

MLP benefits from an economical production process that makes it much less expensive than clad pipe. This can save tens of millions of US dollars in a large subsea project, considering the many kilometres of lined pipe that may be required. However, MLP is susceptible to problems during spooling and unspooling that make it difficult to use in reel-lay applications. Specifically, under bending deformation, the thick-walled outer pipe may be structurally stable while the thin-walled inner liner sleeve of lower yield strength suffers significant deformation under the combined action of bending and external pressure from the outer pipe. This deformation manifests itself as buckling or wrinkling of the liner sleeve, especially around the intrados or inner curve of the pipe bend. A wrinkled liner sleeve may hinder the smooth flow of well fluids, may decrease fatigue life due to stress concentration and may preclude effective pigging of the pipeline.

In view of the wrinkling problem, the present invention is mainly concerned with MLP as opposed to metallurgically-bonded clad pipe for which wrinkling—of the liner at least—is not such a challenge. The invention is also concerned with plastics-lined pipes. Both MLP and plastics-lined pipes are characterised by the possibility of localised longitudinal slippage of the liner sleeve relative to the outer pipe upon bending deformation of the lined pipe, with consequent undesirable deformation of the liner sleeve manifested as wrinkling. However, in a broad sense, the invention could also have benefit when bending clad pipe and indeed when bending unlined pipe, if bending is such as to give rise to unwanted inward deformation of the pipe wall.

Wrinkling of the intrados of a pipe bend during bending is a well-known phenomenon. Standards such as ASME B31.3, API 5L and DNV-OS-F-101 recommend that wrinkling should be mitigated by choosing a pipe wall of suitable thickness. However, this approach cannot be applied to double-walled lined pipe in which the outer wall is designed primarily for mechanical strength but the inner wall is designed primarily for corrosion resistance and is made of a material with lower yield strength.

WO 2008/072970, WO 2010/010390 and WO 2011/051218 address the problem of liner wrinkling by filling at least a substantial part of a lined pipeline with a pressurised fluid such as water. However, connecting a structure such as a pipeline accessory is complex when the pipeline is preliminarily filled with a pressurising liquid. For example, the pressure must be reduced when cutting the pipeline and the liquid has to be re-pressurised in the spooled pipeline before unspooling can restart. There is also a need to manage and to reduce the presence of air in the pipelines before re-pressurisation, which could otherwise undermine the benefits of the procedure in terms of wrinkle mitigation.

GB 2553837 discloses a method of refilling and pressurising a pipeline using a pig within the pipeline. However this method works better if water flows through the pig, which limits the water flow rate and so delays the procedure. In this respect, any delays are undesirable because reel-lay vessels are extremely valuable capital assets that cost hundreds of millions of US dollars to acquire and hundreds of thousands of US dollars per day to operate.

WO 2018/051191 discloses the use of a port on the accessory structure to refill the pipeline with liquid and to re-pressurise the liquid. However, this is not as efficient as methods that employ pigs within the pipeline for re-pressurisation. The friction of pigs with the inner surface of the pipeline allows better management of high pressure differentials.

BRIEF SUMMARY OF THE INVENTION

Against this background, the invention resides in a method of joining a structure to a reeled pipeline, which method is performed on board a reel-lay vessel to enable fluid communication between the pipeline and a conduit of the structure aligned with the lumen of the pipeline. The method comprises:
  suspending a trailing end portion of the pipeline in an upright orientation on a reel-lay tower of the vessel, the pipeline initially being substantially filled with a pressurising liquid under elevated pressure;
  depressurising the pressurising liquid in the pipeline;
  draining the pressurising liquid from the trailing end portion while retaining the pressurising liquid in an inclined portion of the pipeline extending from the tower to a reel of the vessel, and in a spooled portion of the pipeline coiled on the reel;
  inserting a pig into the trailing end portion through a trailing end of the pipeline, preferably to a level spaced upwardly from the trailing end;
  joining the structure to the trailing end of the pipeline; and
  pumping additional pressurising liquid into a leading end of the pipeline on the reel to flood the trailing end portion and to propel the pig from the trailing end portion into the conduit of the structure, thereby expelling through a port of the structure air that was trapped in the trailing end portion between the pig and the structure.

The pig may, for example, be propelled along the conduit and against a pressure cap of the structure that supports the port. Suction of a pump may be applied simultaneously to the port.

The method of the invention then further comprises pumping additional pressurising liquid through the port and into the conduit of the structure to propel the pig toward the leading end of the pipeline. A quantity of pressurising liquid that is driven ahead of the pig may be expelled through the leading end of the pipeline. Again, suction of a pump may be applied simultaneously to the leading end of the pipeline.

The pig may be propelled into the spooled portion of the pipeline coiled on the reel, in which case the pipeline may subsequently be unspooled from the reel while the pig remains in the spooled portion of the pipeline. Unspooling and straightening of the pipeline is preferably completed before the pig passes the reel-lay tower, and more preferably while the pig remains in the spooled portion of the pipeline.

Air may be driven ahead of the pig as the pig is propelled toward the leading end of the pipeline, which air was trapped between the inclined portion of the pipeline and the pig in the trailing end portion of the pipeline. At least some of the air that is driven ahead of the pig may be expelled through the leading end of the pipeline.

The method of the invention may then further comprise re-pressurising the pressurising liquid and lowering the structure from the vessel while unspooling the thus-pressurised pipeline from the reel.

Preliminarily, the pipeline may be cut beneath the trailing end portion to define the trailing end. For example, the pipeline may be a combination of sequentially-spooled pipeline sections joined by a transition joint that is cut out to define the trailing end.

The pressurising liquid may be partially depressurised before cutting the pipeline. In that case, the partially-depressurised pressurising liquid may be retained in the pipeline with a retaining pig located in the trailing end portion above the trailing end. The retaining pig may then be driven out of the trailing end by pumping additional pressurising liquid into the leading end of the pipeline under elevated pressure.

Embodiments of the invention implement a method to connect a structure to a reeled pipeline filled with a pressurising liquid, exemplified here as water. The method comprises the following steps: draining a vertical section of the pipeline located in a lay ramp or tower; cutting the pipeline and granting access to the cut end of an upper section of the pipeline; temporarily connecting a pig launcher at an end of the upper section of the pipeline; advancing at least one pig a few metres in the pipeline; removing the pig launcher and welding the structure to the pipeline; pumping water in from the end of the pipeline spooled on the reel; refilling the empty section and pushing the pig until a cap of the structure; pressurising the reeled pipeline upper section; and restarting normal laying of the pipeline.

A step of water injection from the cap of the structure, substantially pushing the pig into the pipeline, may be performed before pressurising the reeled pipeline.

In summary, in a method in accordance with the invention for joining a structure to a water-filled pipeline aboard a reel-lay vessel, a trailing end portion of the pipeline is suspended upright on a reel-lay tower. Water is drained from the trailing end portion while being retained in an inclined portion of the pipeline extending from the tower to a reel of the vessel, and in a spooled portion of the pipeline coiled on the reel. The structure is joined to a trailing end of the pipeline after inserting a pig into the trailing end portion through the trailing end. Pumping additional water into a leading end of the pipeline on the reel propels the pig from the trailing end portion into a conduit of the structure while flooding the trailing end portion. This expels air through a port of the structure that was trapped in the trailing end portion between the pig and the structure.

In principle, the invention provides a method of joining a structure to a pipeline for fluid communication between the pipeline and a conduit of the structure. The method comprises: draining a trailing end portion of the pipeline of a pressurising liquid while retaining the pressurising liquid in other portions of the pipeline; inserting a pig into the trailing end portion through a trailing end of the pipeline; joining the structure to the trailing end of the pipeline; and introducing additional pressurising liquid through a leading end of the pipeline opposed to the trailing end. The additional pressurising liquid floods the trailing end portion and drives the pig from the trailing end portion into the conduit of the structure. This expels, through the structure, substantially all of any air that was trapped in the trailing end portion between the pig and the structure.

BRIEF DESCRIPTION OF THE SEVERAL VIEWS OF THE DRAWINGS

In order that the invention may be more readily understood, reference will now be made, by way of example, to the accompanying drawings in which:

FIG. 15 is a side view of the terminal accessory approaching the seabed, with the initiation chain already coupled to a subsea foundation.

DETAILED DESCRIPTION OF THE INVENTION

Figure 1:
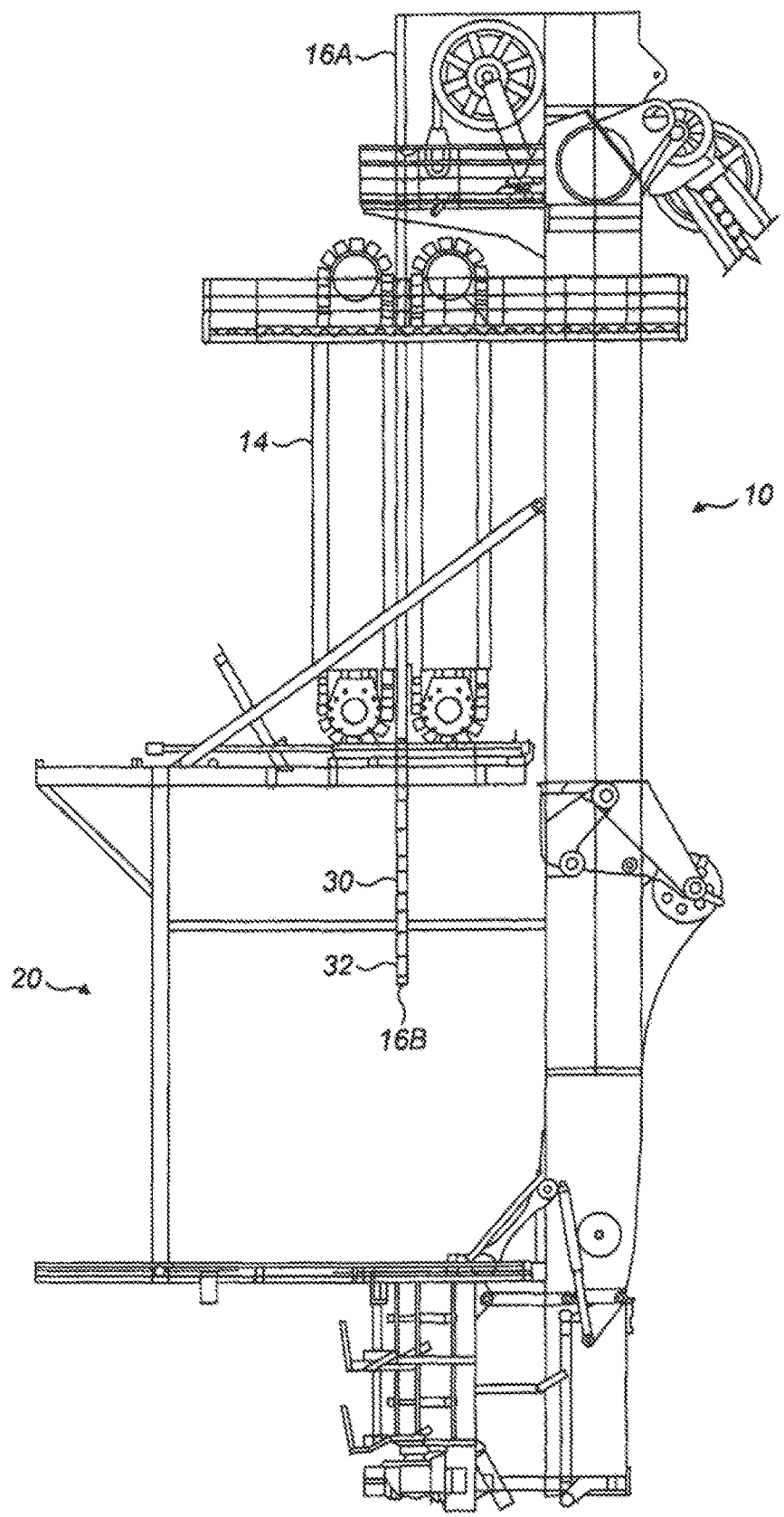
FIG. 1 is a side view of a reel-lay tower of a reel-lay vessel, supporting a cut free or trailing end portion of a water-filled pipeline.
Figure 2:
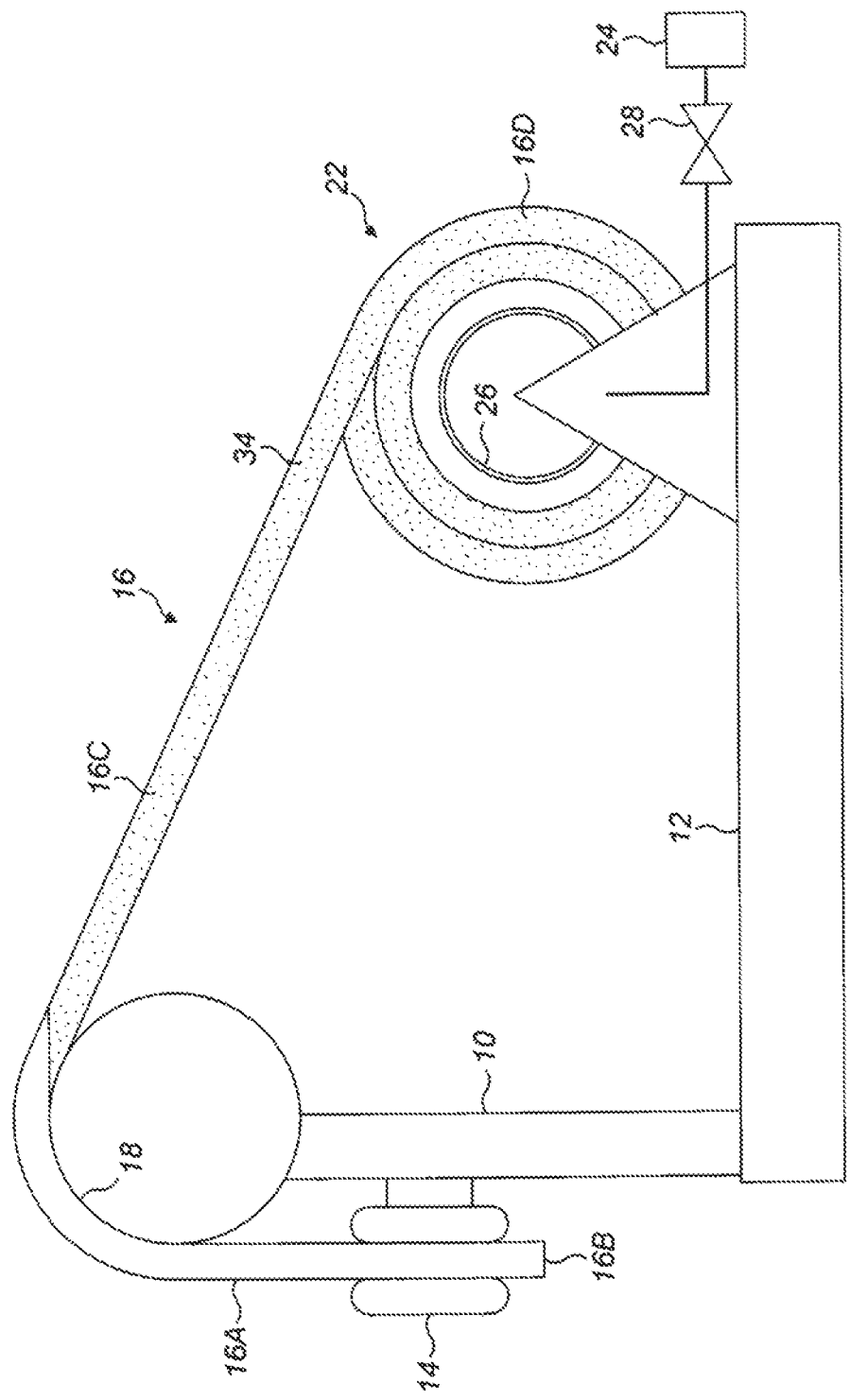
FIG. 2 is a schematic side view of the reel-lay tower of FIG. 1 in combination with a reel of the reel-lay vessel onto which the pipeline is spooled.
Figure 3:
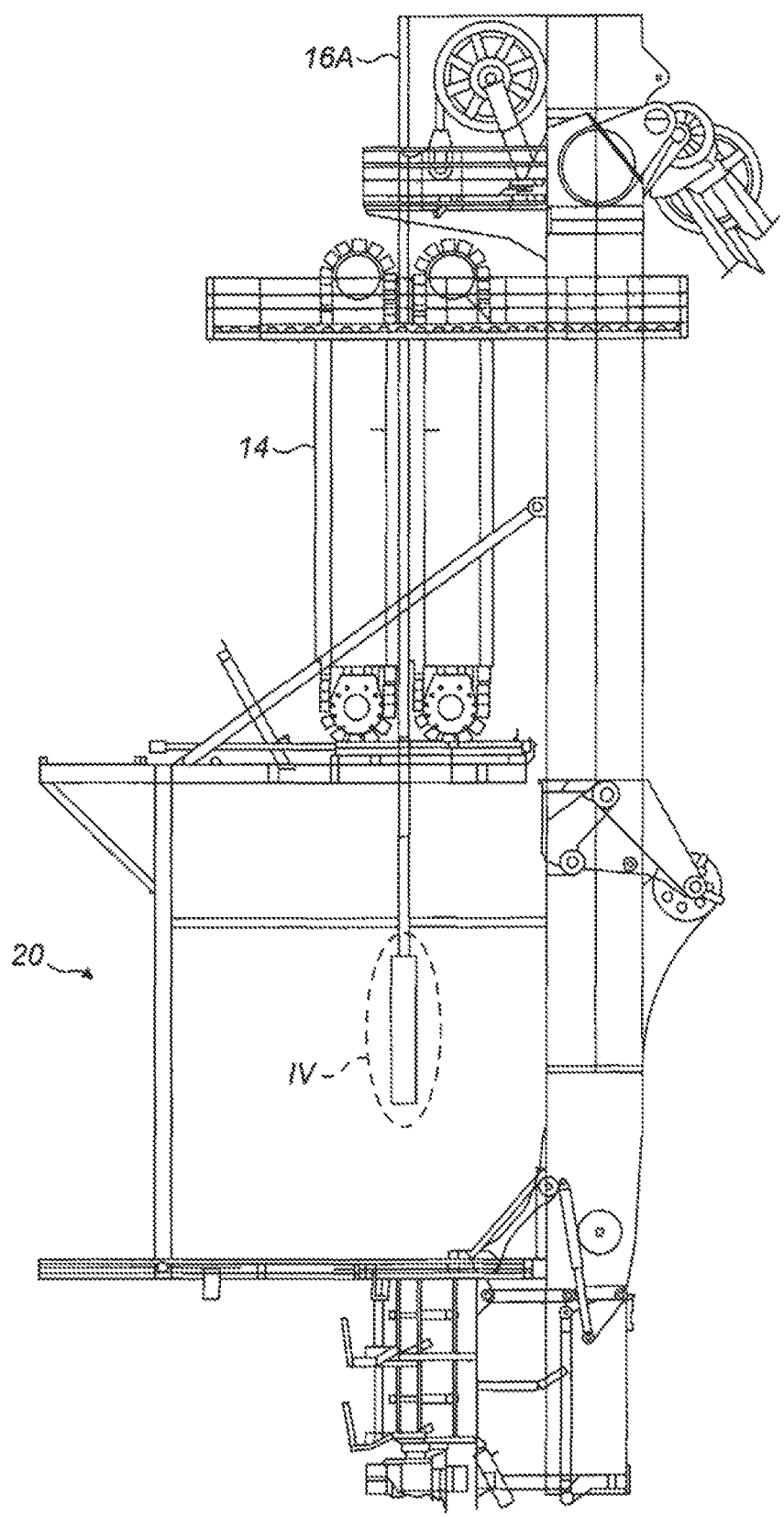
FIG. 3 corresponds to FIG. 1 but shows a pig loading tool attached temporarily to the free end of the pipeline.
Figure 4:
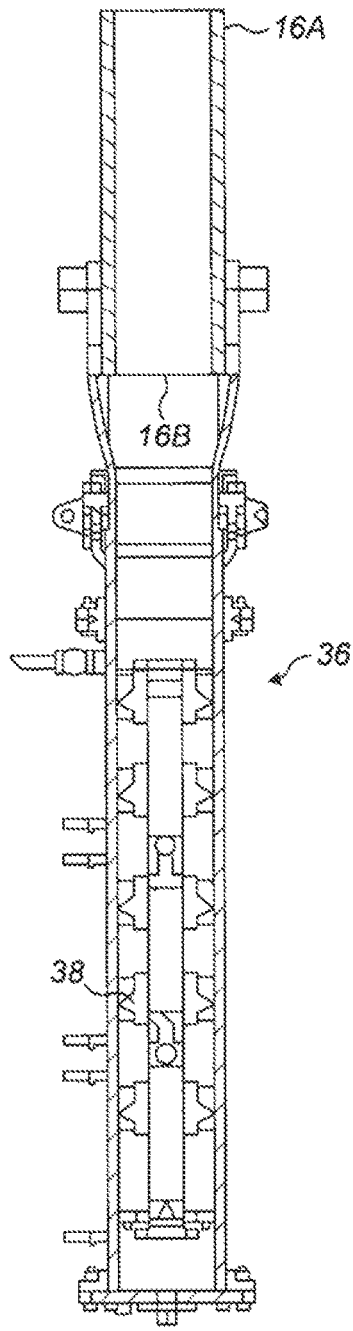
FIG. 4 is a sectional view of the pig loading tool shown as Detail IV in FIG. 3, containing a pig in the form of a train of pig elements.

Referring firstly to FIGS. 1 and 2, these drawings shows a reel-lay ramp or tower 10 of a pipelaying vessel 12 in a pipelaying configuration. The tower 10 is shown here in a vertical orientation but it may also be tilted to a non-vertical, but still upright, orientation for other pipelaying operations. The tower 10 may also be tilted further into a lowered configuration for loading and during transit of the vessel 12.

As is conventional, the reel-lay tower 10 supports a tensioner system 14. Other conventional features of the reel-lay tower 10, such as a straightener system, have been omitted from these edited and simplified drawings.

A lined pipeline 16 curves over an aligner 18 at the top of the reel-lay tower 10 as shown in FIG. 2. A free end or trailing end portion 16A of the pipeline 16 hangs vertically from the aligner 18 and extends through the tensioner system 14. Thus, a free end or trailing end 16B of the pipeline 16 hangs beneath the tensioner system 14 in a workstation 20 at the base of the tower 10, as shown in FIG. 1.

FIG. 2 shows that an obliquely-inclined portion 16C of the pipeline 16 extends from the aligner 18 to a reel 22 of the vessel 12 that turns about a horizontal axis. A major portion 16D of the pipeline 16 is spooled onto the reel 22 in a series of coils that are arrayed on the reel 22 side-by-side and in multiple layers.

A leading end of the pipeline 16 is coupled to the reel 22 for fluid communication with a pre-commissioning spread 24 of the vessel 12 for pumping, conditioning, storing, and supplying a pressurising liquid such as water or MEG (monoethylene glycol). For the purpose, a manifold 26 on the reel 22 in fluid communication with the leading end of the pipeline 16 is also in fluid communication with the pre-commissioning spread 24 via a shut-off valve 28.

The pre-commissioning spread 24 typically comprises pumps, filtering equipment and a reservoir for receiving or supplying a sufficient volume of the pressurising liquid to keep the pipeline 16 full where necessary. The pumps may comprise a combination of a high-capacity pump and a high-pressure pump. The high-capacity pump has a high flowrate to speed filling of the pipeline 16 with the pressurising liquid. Conversely, the high-pressure pump can pressurise the filled pipeline 16 to a pressure beyond the capability of the high-capacity pump, for example to an internal pressure of between 30 and 50 bar to combat wrinkling of the liner during unspooling.

In FIG. 1, the trailing end portion 16A of the pipeline 16 is shown containing a retaining pig 30, in this case comprising an articulated train of pig elements, and an end closure 32 that seals the trailing end 16B of the pipeline 16 outboard of the pig 30. The pig 30 and the end closure 32 together retain a body of pressurising liquid, in this example water 34, that fills the full length of the pipeline 16. The water 34 within the pipeline 16 is a remnant of the spooling process, in which the water 34 was pressurised to combat wrinkling of the liner as the pipeline 16 underwent bending during its longitudinal movement from a fabrication site and onto the reel 22.

In this situation, the pipeline 16 is prepared for laying by being partially depressurised before removing the end closure 32 and then re-pressurising the water 34 within the pipeline 16 from the leading end on the reel 22. This pushes out the pig 30 into a pig removal tool (not shown) that may be coupled temporarily to the trailing end 16B of the pipeline 16. As soon as the pig 30 has been pushed out, the pipeline 16 is fully depressurised to atmospheric pressure.

It will be apparent that when the pig 30 is removed, the water 34 in the trailing end portion 16A of the pipeline 16 will drain out through the trailing end 16B. This leaves the trailing end portion 16A of the pipeline 16 empty of water 34 and instead full of air, from the trailing end 16B up to the start of the inclined portion 16C at the top of the aligner 18 as shown in FIG. 2. The remainder of the pipeline 16, namely the inclined portion 16C and the major portion 16D coiled around the reel 22, remains full of water 34 but that water 34 is now at atmospheric pressure.

In analogous operations, a new trailing end 16B may also be formed by cutting the pipeline 16 during a pipelaying process, after launching an initial portion of the pipeline 16 into the sea. In that case, there will be no pig 30 or end closure 32 to remove from the trailing end 16B. Cutting the pipeline 16 in this way may be required either to insert an in-line accessory into the pipeline 16 or to lay a second pipeline that is spooled onto the reel 22 in end-to-end series with a first pipeline. It is even possible for first and second sequentially-spooled pipelines to have different diameters, in which case they will be joined by a tapered transition joint that must also be cut out upon reaching the workstation 20.

In each case, the method of the invention will involve the or each pipeline 16 that remains on the reel 22 being in the state shown in FIG. 2 before further operations are performed, as will now be explained.

Turning now, then, to FIGS. 3 to 6, these drawings show a pig loading tool 36 that is coupled to the trailing end 16B of the pipeline 16. The pig loading tool 36 comprises a tube that initially contains a pig 38 to be loaded into the pipeline 16.

The pig 38 may be a pig train comprising an articulated series of pig elements. For simplicity, references in this specification to a pig 38 are intended to encompass a pig train comprising two or more pig elements, or a pig comprising only one such element.

Figure 5:
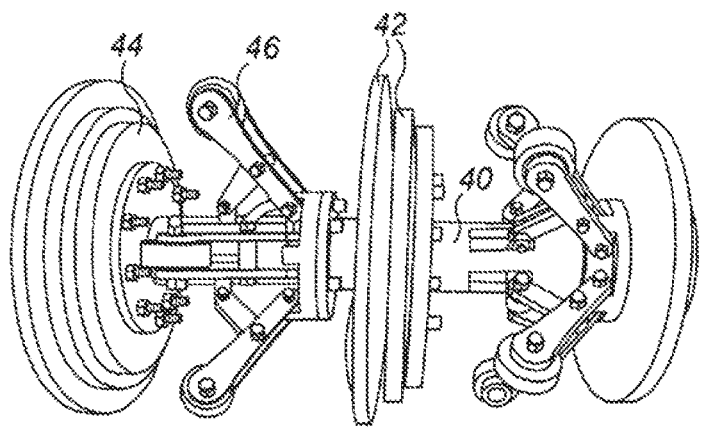
FIG. 5 is a perspective view of a pig element of a pig train that may be launched into the pipeline using the pig loading tool of FIG. 4.
Figure 6:
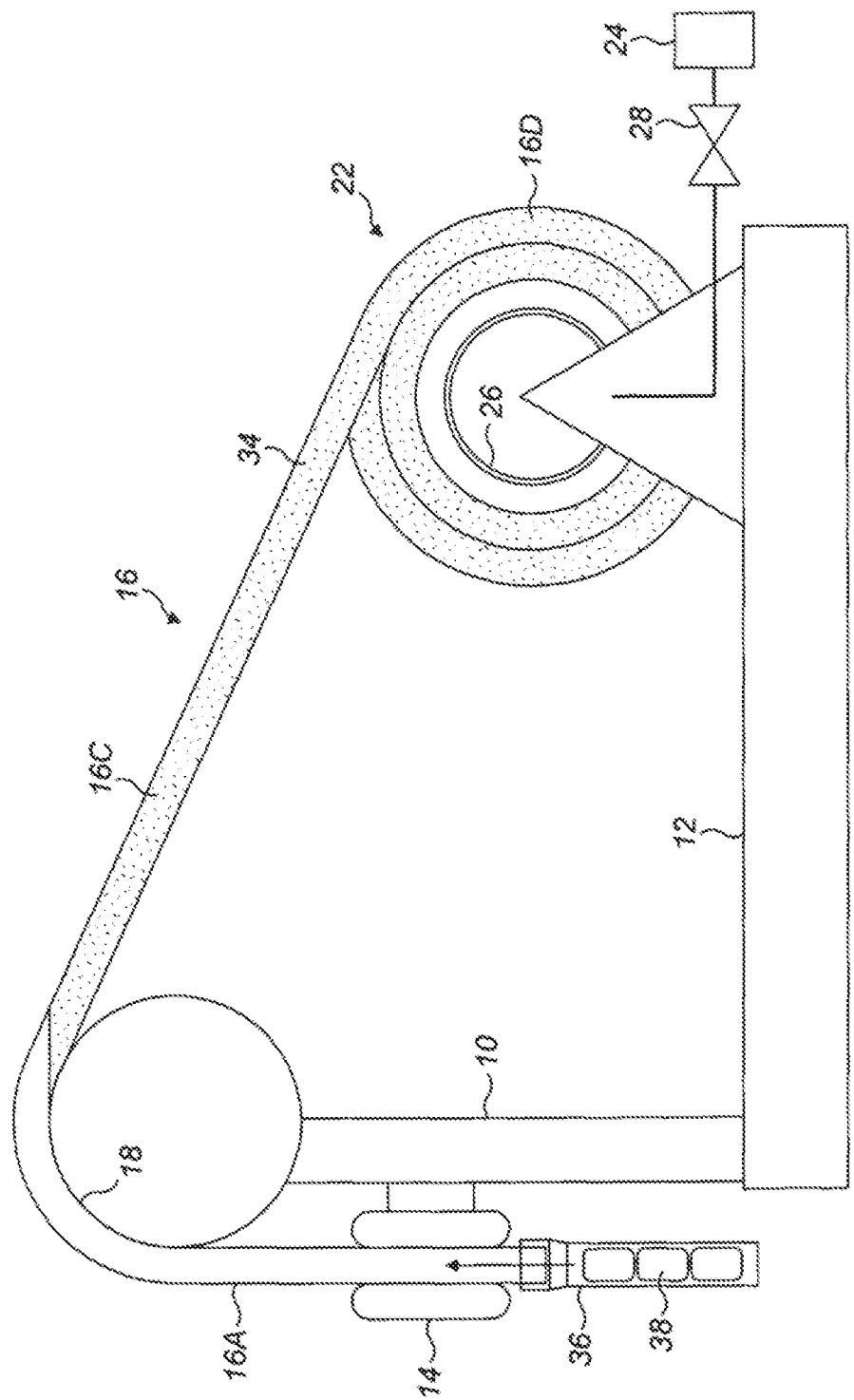
FIG. 6 corresponds to FIG. 2 but shows the pig loading tool coupled with the free end of the pipeline, as also shown in FIG. 3.

One of the elements of the pig 38, shown in FIG. 5, comprises a shaft 40 that extends along a central longitudinal axis. Pairs of resilient sealing discs 42 are grouped in parallel planes that are orthogonal to the central longitudinal axis. The pairs of sealing discs 42 are spaced longitudinally along the shaft 40.

The sealing discs 42 of each pair have different outer diameters. The pig 38 therefore has the optional attribute of variable diameter, in other words being capable of adopting a laterally-contracted state when within a relatively narrow pipe or a laterally-expanded state when within a relatively wide pipe. This equips the pig 38 to handle a situation where two pipelines with different diameters are joined end-to-end and spooled sequentially onto the reel 22.

The pig 38 can be propelled easily along a pipeline 16 of either diameter by differential fluid pressure acting on respective ends of the pig 38. However, there is sufficient sealing around the sealing discs 42 for the pig 38 to be effective in shifting bubbles or pockets of air along the pipeline 16, and to sustain enough differential fluid pressure to achieve this. The pig 38 is designed to sustain unspooling pressurisation and can be fitted with non-return valve if required.

A relatively rigid guide disc 44 is mounted to the shaft 40 beside each pair of sealing discs 42. The guide discs 44 are in planes that are parallel to the sealing discs 42. However, the guide discs 44 are slightly smaller than the sealing discs 42 in the radial direction so as to be a close sliding fit within the narrower pipeline 16. The guide discs 44 thereby keep the pig 38 in concentric relation within the narrower pipeline 16.

As the fixed-diameter guide discs 44 cannot maintain a similarly close sliding fit within the wider pipeline 16, the pig 38 is held concentrically within the wider pipeline 16 by a supplementary wheeled support system 46. The wheeled support system 46 comprises wheel sets spaced longitudinally along the shaft 40. The wheels of each wheel set are spaced angularly around the central longitudinal axis and are supported by respective pivotable arms that are biased in a radially outward direction. Thus, the arms can fold inwardly toward the shaft 40 when the pig 38 is in the narrower pipeline 16 and can pivot outwardly away from the shaft 40 when the pig 38 is in the wider pipeline 16.

The wheeled support system 46 is shown for illustrative purposes only. Other types of pigs known by those skilled in the art may be suitable for the same purpose.

Figure 7:
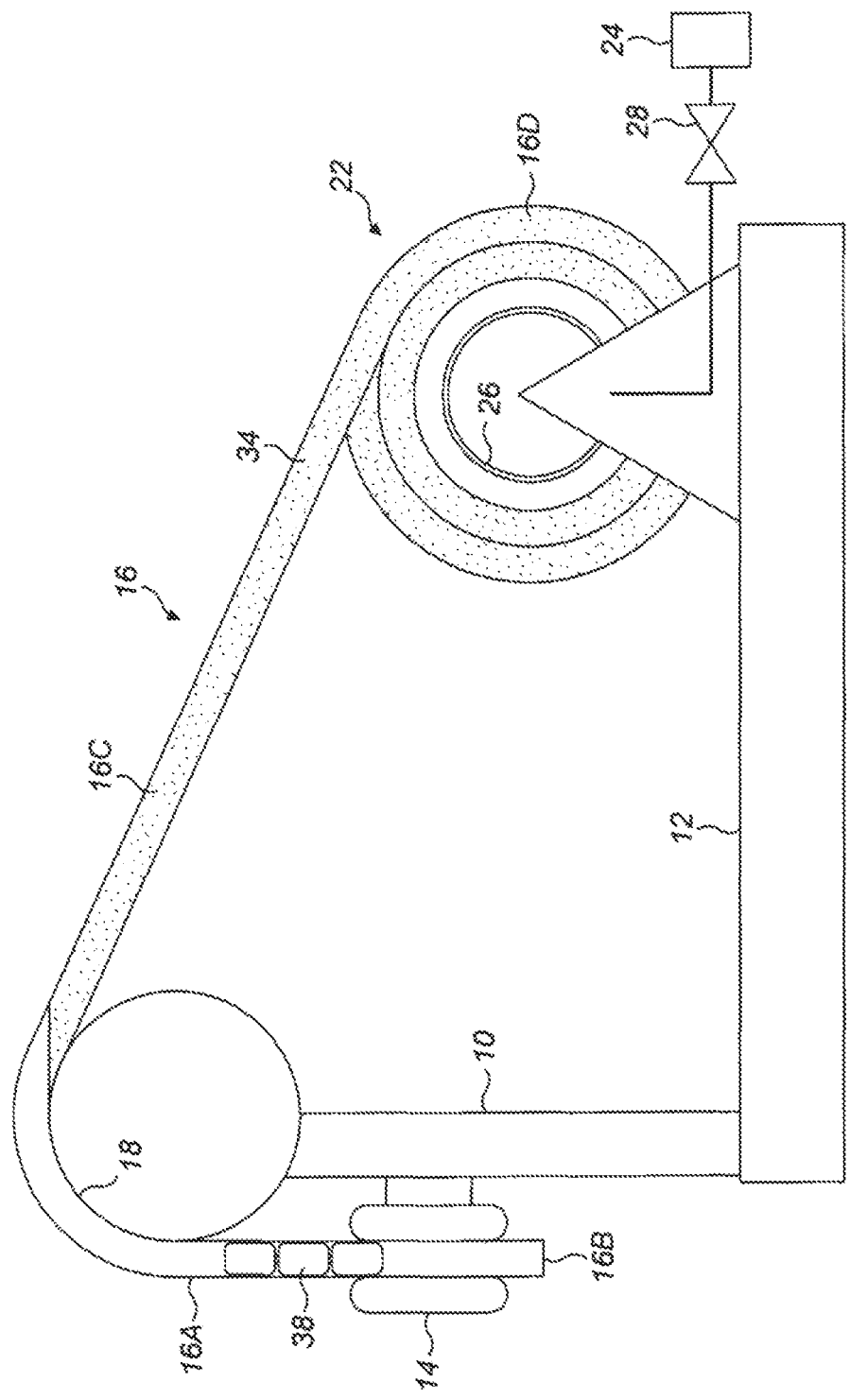
FIG. 7 corresponds to FIG. 6 but shows a pig placed by the pig loading tool a few metres up into the pipeline from the free end.

The pig 38 is pushed out of the open top of the pig loading tool 36 and into the pipeline 16 through the open trailing end 16B of the pipeline 16, either mechanically by a plunger or by fluid pressure. FIG. 7 shows the pig 38 now placed within the trailing end portion 16A of the pipeline 16 and the pig loading tool 36 has been removed.

The pig 38 is suitably positioned about half of the length of a standard pipe joint (hence about 6 m) inward or upward of the trailing end 16B. This keeps the pig 38 out of the way for cutting and welding operations to be performed on and around the trailing end 16B, and in particular to avoid damage due to the heat of welding.

Advantageously, the sealing between the pig 38 and the inner surface of the pipeline 16 is sufficient to ensure that any water 34 that may spill over the aligner 18 from the inclined portion 16C of the pipeline 16 into the trailing end portion 16A cannot reach the trailing end 16B, where it could otherwise disrupt welding operations.

In this respect, welding operations may be performed to attach an accessory to the pipeline 16 at the workstation 20. More specifically, in this example, the accessory is a pipeline 16 end termination or PLET 48 that is shown schematically in FIG. 8 and in detail in FIG. 9. In other circumstances, the accessory could be an in-line accessory such as a tee structure.

The PLET 48 comprises a curved inner conduit 50 that is aligned with and welded to the trailing end 16B of the pipeline 16 for fluid communication with the pipeline 16. The conduit 50 terminates in a pressure cap 52 on a side of the PLET 48, which side will be uppermost when the PLET 48 has been landed on the seabed. A flooding and discharge hose 54 is coupled to a port of the pressure cap 52 via a shut-off valve 56 to effect fluid communication between the conduit 50 of the PLET 48 and a flooding and discharge system 58.

The flooding and discharge system 58 is a counterpart of the pre-commissioning spread 24 and comprises pumps, filtering equipment and a reservoir for receiving or supplying the water 34 or other pressurising liquid that is shown in the pipeline 16. The flooding and discharge system 58 may, indeed, share elements of the pre-commissioning spread 24, or the pre-commissioning spread 24 could serve also as the flooding and discharge system 58.

Figure 8:
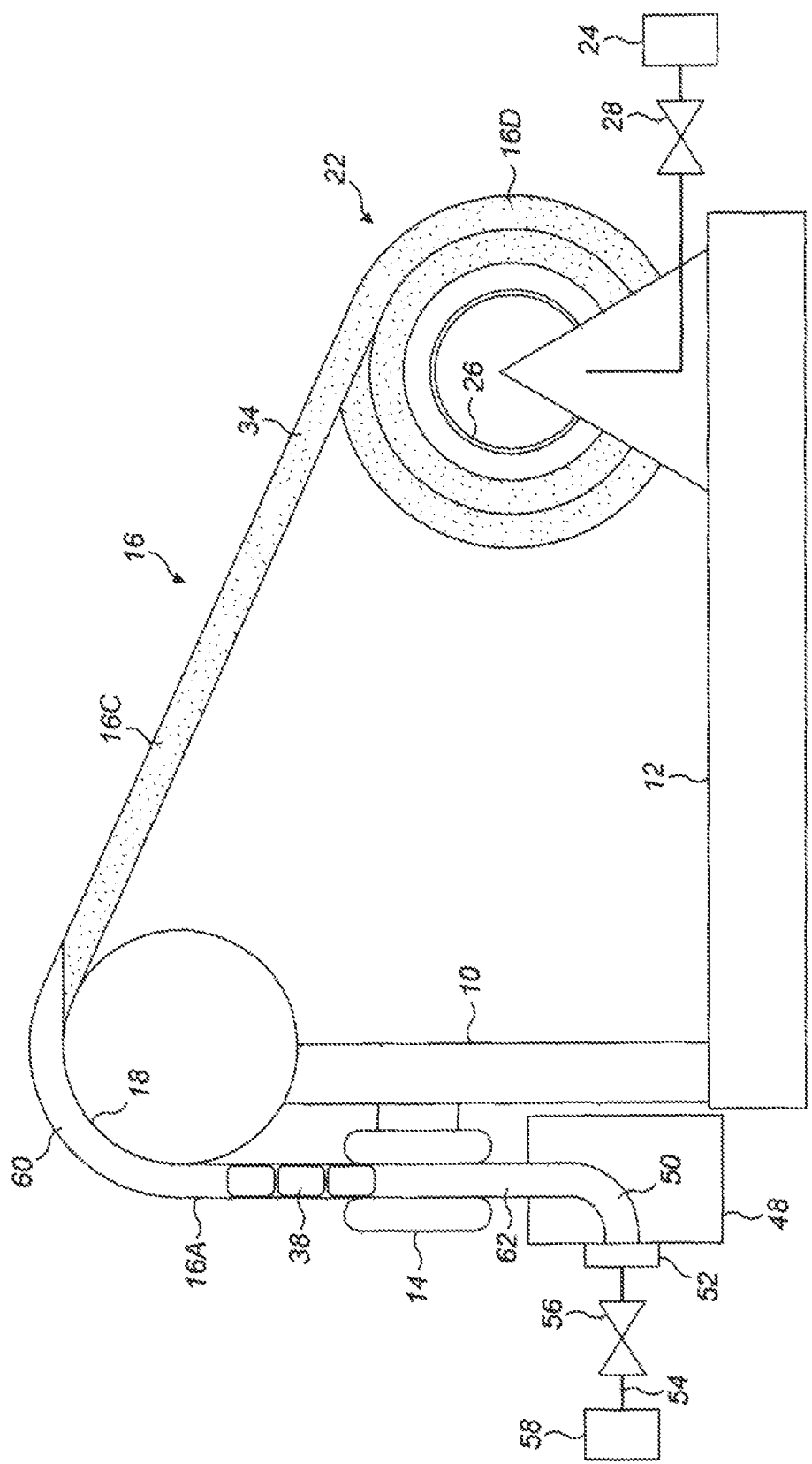
FIG. 8 corresponds to FIG. 7 but shows a terminal accessory attached to the end of the pipeline.

It will be apparent that when the PLET 48 has been joined to the pipeline 16 as shown in FIG. 8, the vertical trailing end portion 16A of the pipeline 16 contains upper and lower volumes of air 60, 62 that are trapped, respectively, above and below the pig 38. The lower volume of air 62 trapped in the pipeline 16 below the pig 38 extends into the conduit 50 of the PLET 48.

With reference to the description that follows, the related schematic drawings follow the convention that the shut-off valves 28, 56 are shown as white when open and as black when closed.

Figure 9:
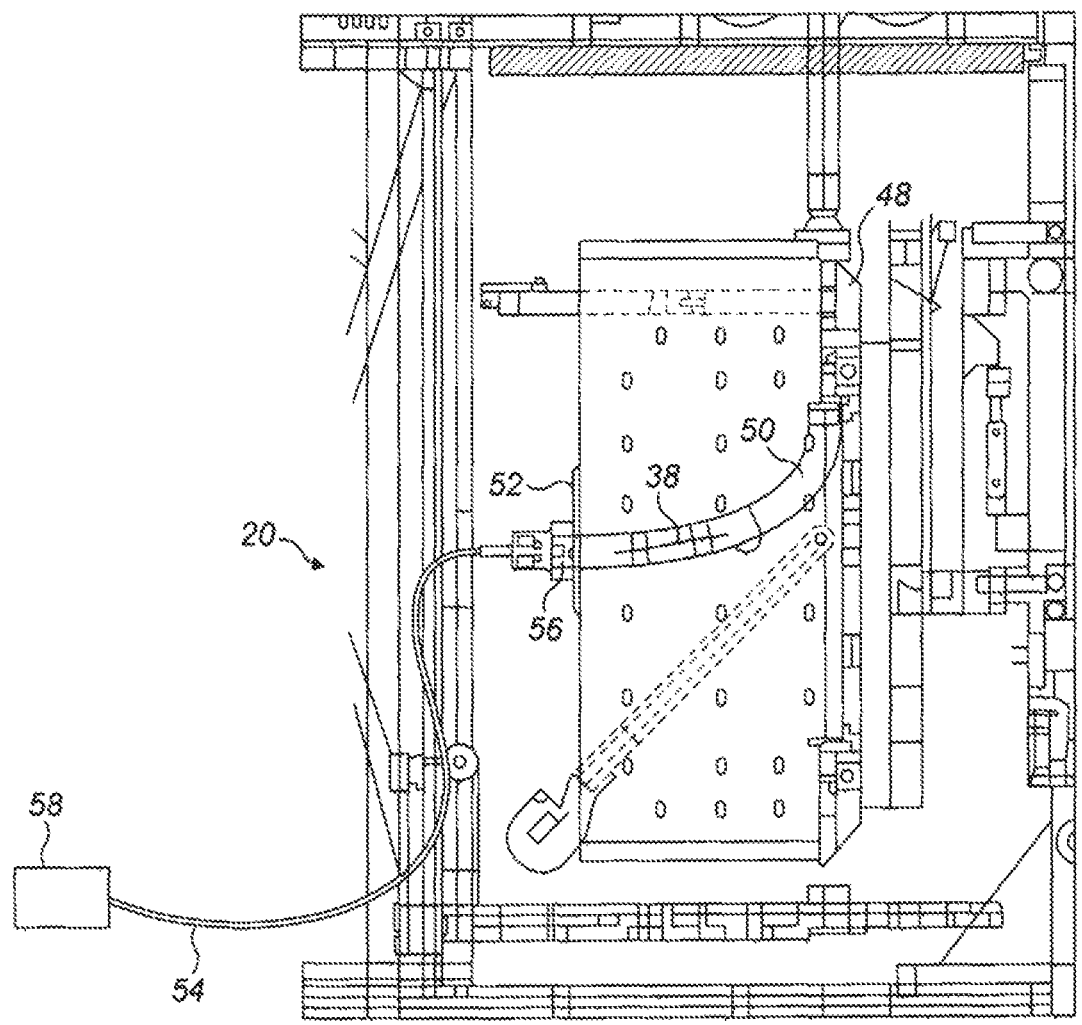
FIG. 9 is a sectional side view of the terminal accessory shown schematically in FIG. 8 at the end of the pipeline and containing the pig that was placed into the pipeline as shown in FIG. 7, using the pig loading tool of FIGS. 3 and 6.
Figure 10:
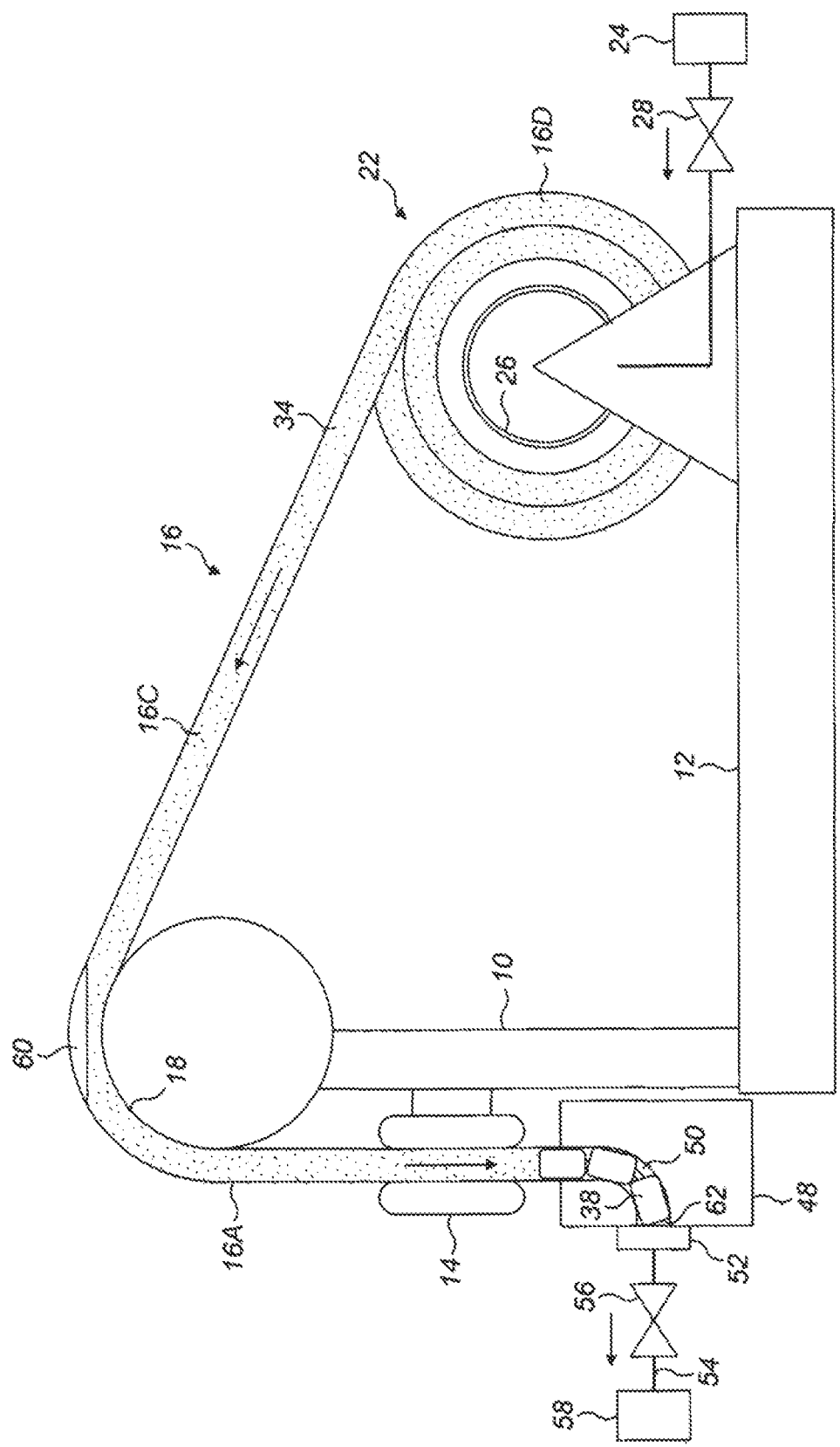
FIG. 10 is a schematic counterpart of FIG. 9, in the wider context of the reel-lay tower and the reel of the reel-lay vessel.

FIG. 9, and its schematic counterpart FIG. 10, show the pig 38 now driven into the conduit 50 of the PLET 48 to a position close to, or abutting, the pressure cap 52. To achieve this, the shut-off valve 56 in the flooding and discharge hose 54 is open. So too is the shut-off valve 28 between the reel 22 and the pre-commissioning spread 24. The pre-commissioning spread 24 is activated to pump water 34 into the leading end of the pipeline 16 on the reel 22. Optionally, a pump in the flooding and discharge system 58 may also be activated, in the opposite sense of generating suction, to draw air out of the conduit 50 of the PLET 48 via the pressure cap 52.

In consequence of these actions, the level of water 34 in the inclined portion 16C of the pipeline 16 between the reel 22 and the aligner 18 will rise. This additional water 34 spills over the aligner 18 and into the vertical trailing end portion 16A of the pipeline 16 as shown in FIG. 10, substantially filling the trailing end portion 16A above the pig 38.

As the pressure of the water 34 in the pipeline 16 is increased with the injection of further water 34 into the leading end of the pipeline 16 on the reel 22, the pig 38 is driven down the trailing end portion 16A of the pipeline 16 and into the conduit 50 of the PLET 48. This downward movement of the pig 38 expels the lower volume of air 62 from the pipeline 16 and from the PLET 48 that was previously trapped under the pig 38. That expelled air 62 is drawn or pumped through the pressure cap 52, along the flooding and discharge hose 54 and into the flooding and discharge system 58.

With increasing pressure, the upper volume of air 60 that was above the pig 38 is compressed as shown in FIG. 10. That upper volume of air 60 is trapped as a pocket at the apex of the pipeline 16 above the aligner 18, at the junction between the trailing end portion 16A and the inclined portion 16C of the pipeline 16.

Figure 11:
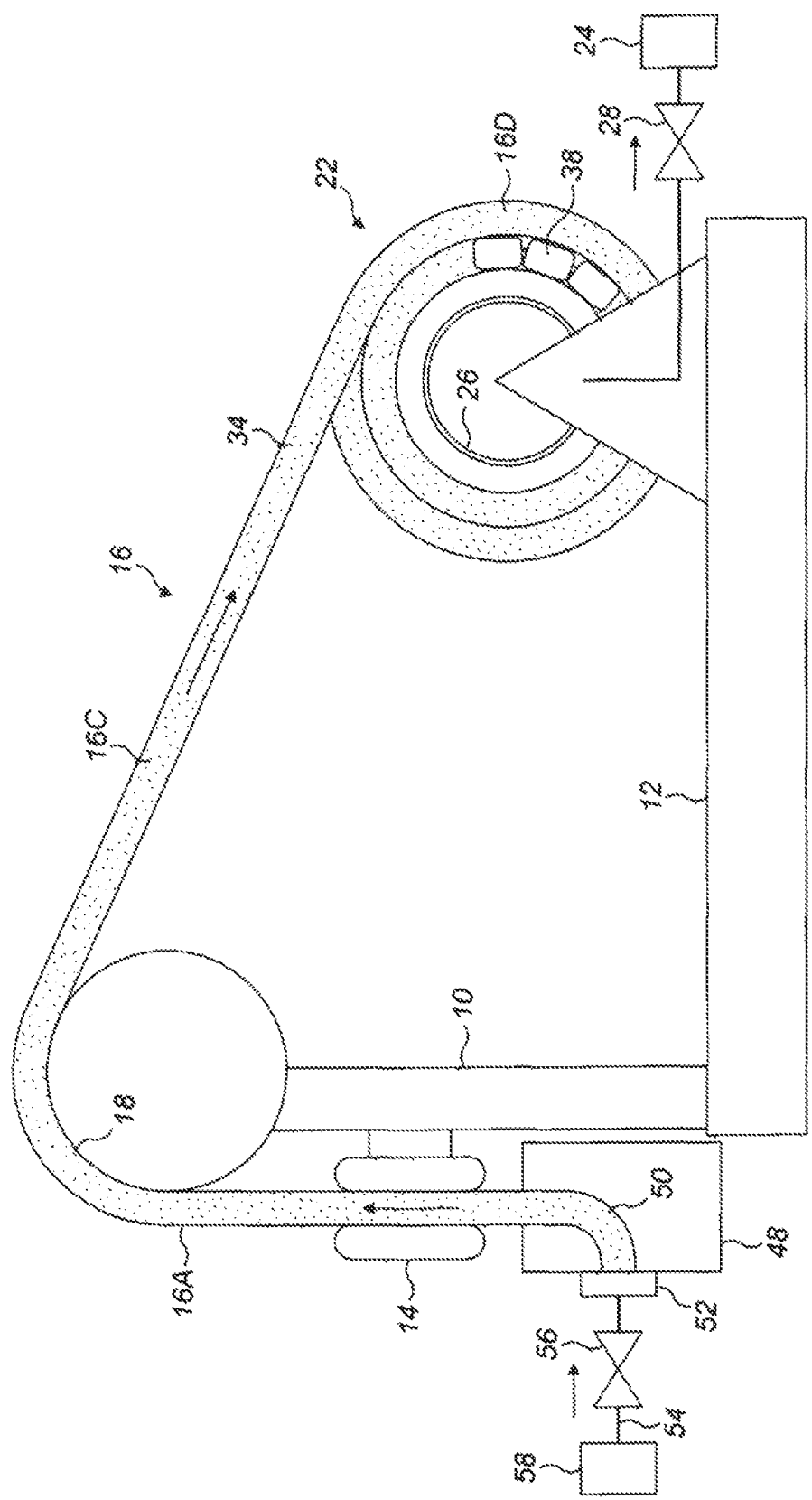
FIG. 11 corresponds to FIG. 10 but shows the pig driven along the pipeline from the terminal accessory into a coil of the pipeline spooled on the reel.

When substantially all of the lower volume of air 62 has been expelled from the pipeline 16 via the conduit 50 and the pressure cap 52 of the PLET 48, the next phase of operation begins as shown in FIG. 11. Here, the shut-off valves 28, 56 in the flooding and discharge hose 54 and between the reel 22 and the pre-commissioning spread 24 remain open but the pumping direction is reversed. That is to say, the or each pump of the flooding and discharge system 58 is activated to pump water 34 into the conduit 50 of the PLET 48 between the pressure cap 52 and the pig 38. This elevates fluid pressure acting on the trailing end of the pig 38 and so drives the pig 38 along the pipeline 16 and around the coils of the pipeline 16 on the reel 22 as shown in FIG. 11. Potentially the pig 38 may be advanced a kilometre or more along the pipeline 16, depending upon the length of the pipeline 16.

As the pig 38 advances along the pipeline 16, water 34 pushed ahead of the pig 38 flows from the leading end of the pipeline 16 on the reel 22 and into the pre-commissioning spread 24. Optionally, the or each pump of the pre-commissioning spread 24 may also be activated, in the opposite sense of generating suction, to draw water 34 out of the leading end of the pipeline 16.

It will be apparent that as the pig 38 transits the apex of the pipeline 16 around the aligner 18, it will collect the residual upper volume of air 60 that remained trapped there. The pig 38 will push that air 60 ahead of it as it moves down the inclined portion 16C of the pipeline 16 and into the major, coiled portion 16D of the pipeline 16 that is spooled on the reel 22. If the pig 38 advances far enough in the pipeline 16, at least some of that residual air 60 may be expelled or drawn off from the leading end of the pipeline 16 via the reel 22. In any event, the pig 38 will trap the residual air 60 on the reel 22 and so will ensure that the majority of the length of the pipeline 16, between the pig 38 and the PLET 48, is substantially full of water 34 and hence free of air.

When the pig 38 has been advanced as far along the pipeline 16 as required and as much air has been expelled from the pipeline 16 as possible, the pipeline 16 is pressurised. Pressurisation of the water 34 within the pipeline 16 is effected by pumping from the pre-commissioning spread 24 via the leading end on the reel 22 and/or by pumping from the flooding and discharge system 58 that remains connected to the conduit 50 of the PLET 48 via the pressure cap 52. Once the pipeline 16 has been pressurised, the shut-off valves 28, 56 in the flooding and discharge hose 54 and between the reel 22 and the pre-commissioning spread 24 are closed as shown in FIG. 12.

Figure 12:
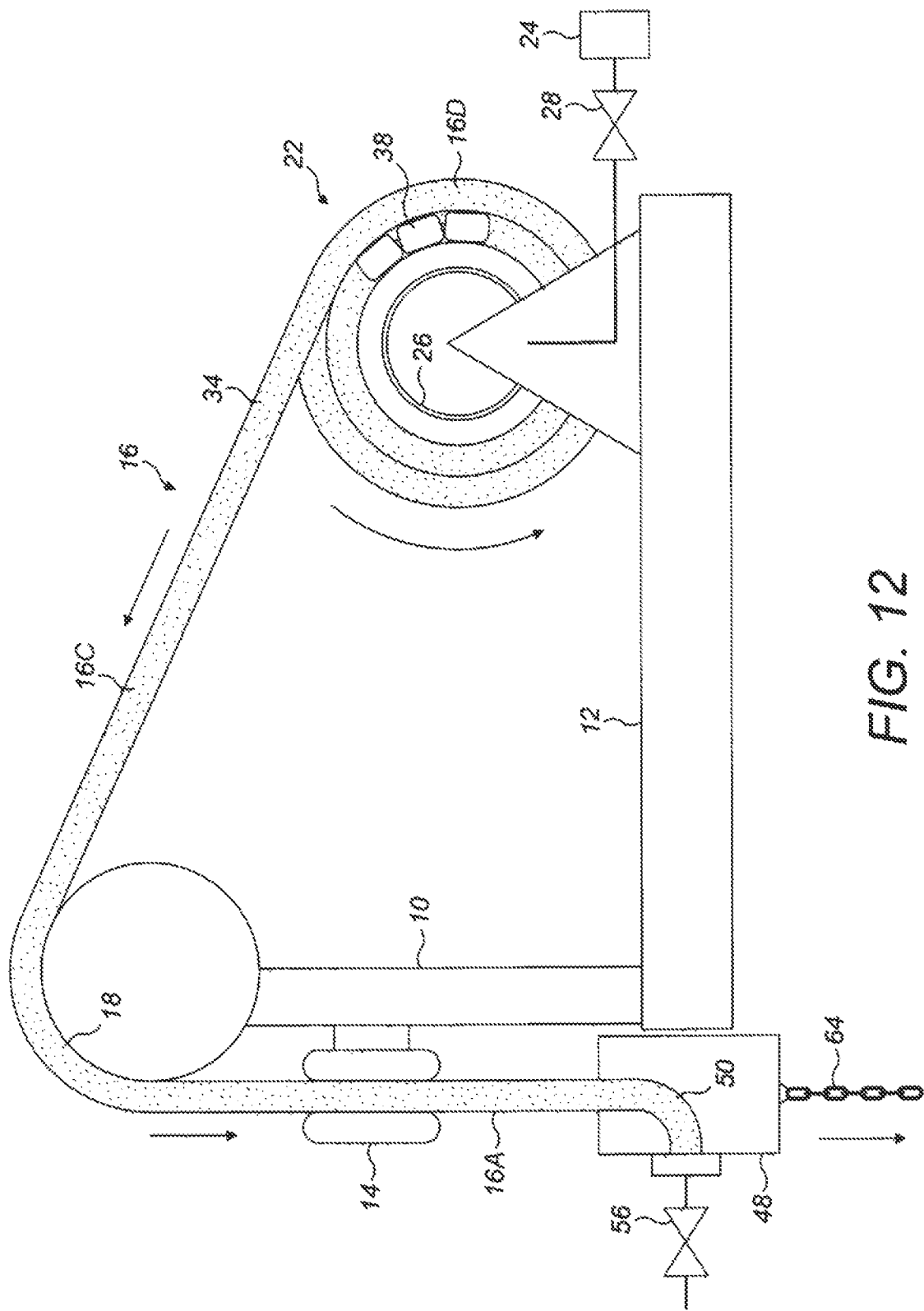
FIG. 12 corresponds to FIG. 13 but shows the pipeline being laid as the reel turns and the terminal accessory is lowered toward the sea.

FIG. 12 shows the PLET 48 now disconnected from the flooding and discharge system 58 and being lowered toward the sea by advancing the pipeline 16 around the aligner 18 and through the tensioner system 14. An initiation line 64, exemplified here by a chain, has previously been hung under the PLET 48.

The reel 22 turns as the pipeline 16 advances to lower the PLET 48, hence progressively unspooling the pipeline 16. Advantageously, as the pig 38 remains within the coils of the pipeline 16 on the reel 22, the substantially fully-flooded, air-free length of the pipeline 16 between the pig 38 and the PLET 48 encompasses the locations of maximum strain where the pipeline 16 is unspooled and then passes over the aligner 18 and then through a straightener system on the reel-lay tower 10. Thus, the pressurised water 34 within the pipeline 16 applies outward pressure uniformly and effectively to minimise wrinkling of the liner where the pipeline 16 experiences the most strain and hence where wrinkling of the liner would otherwise be most likely to occur.

Figure 13:
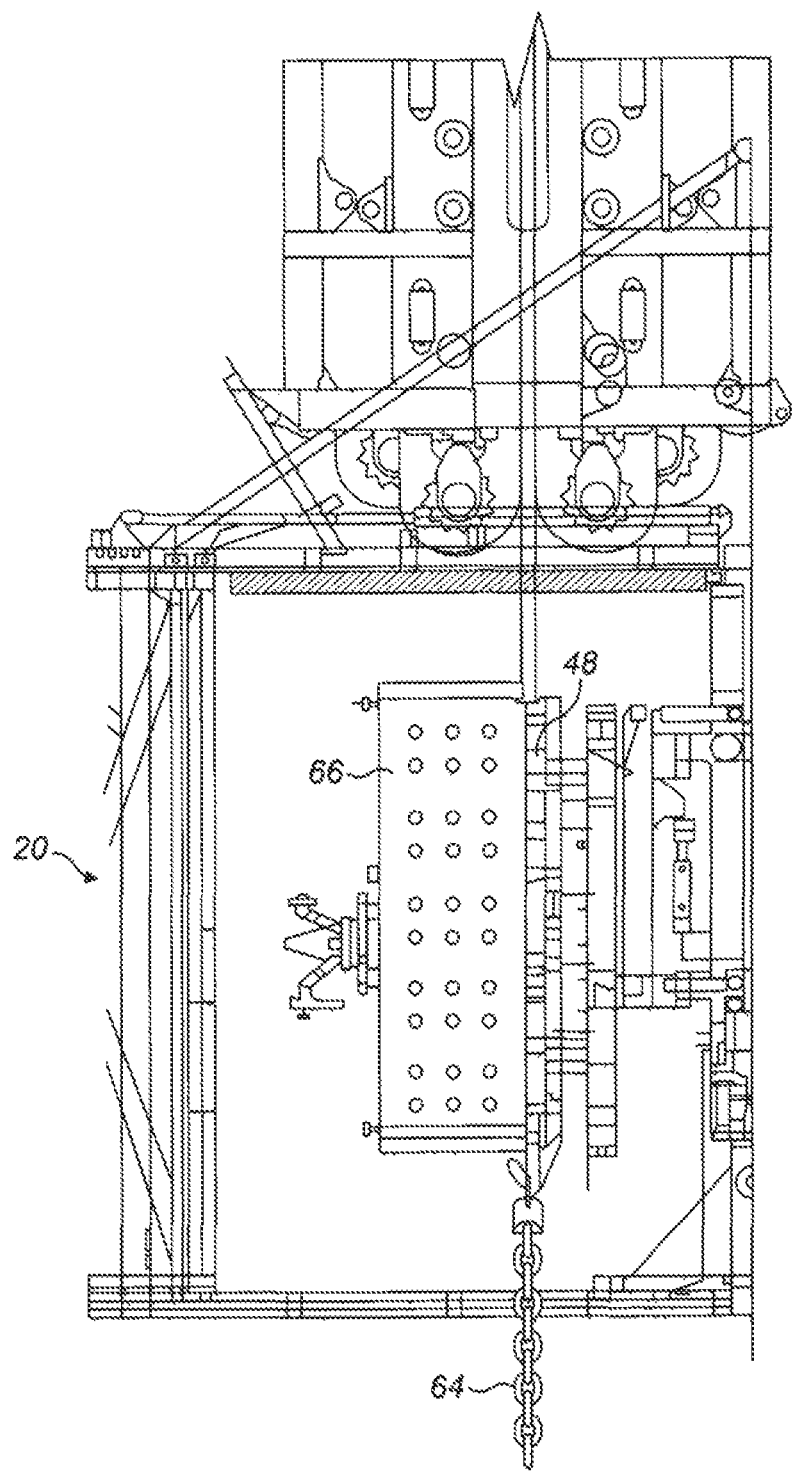
FIG. 13 is a side view of the terminal accessory suspended from the pipeline, also showing an initiation chain hanging beneath the accessory, about to be launched together into the sea.
Figure 14:
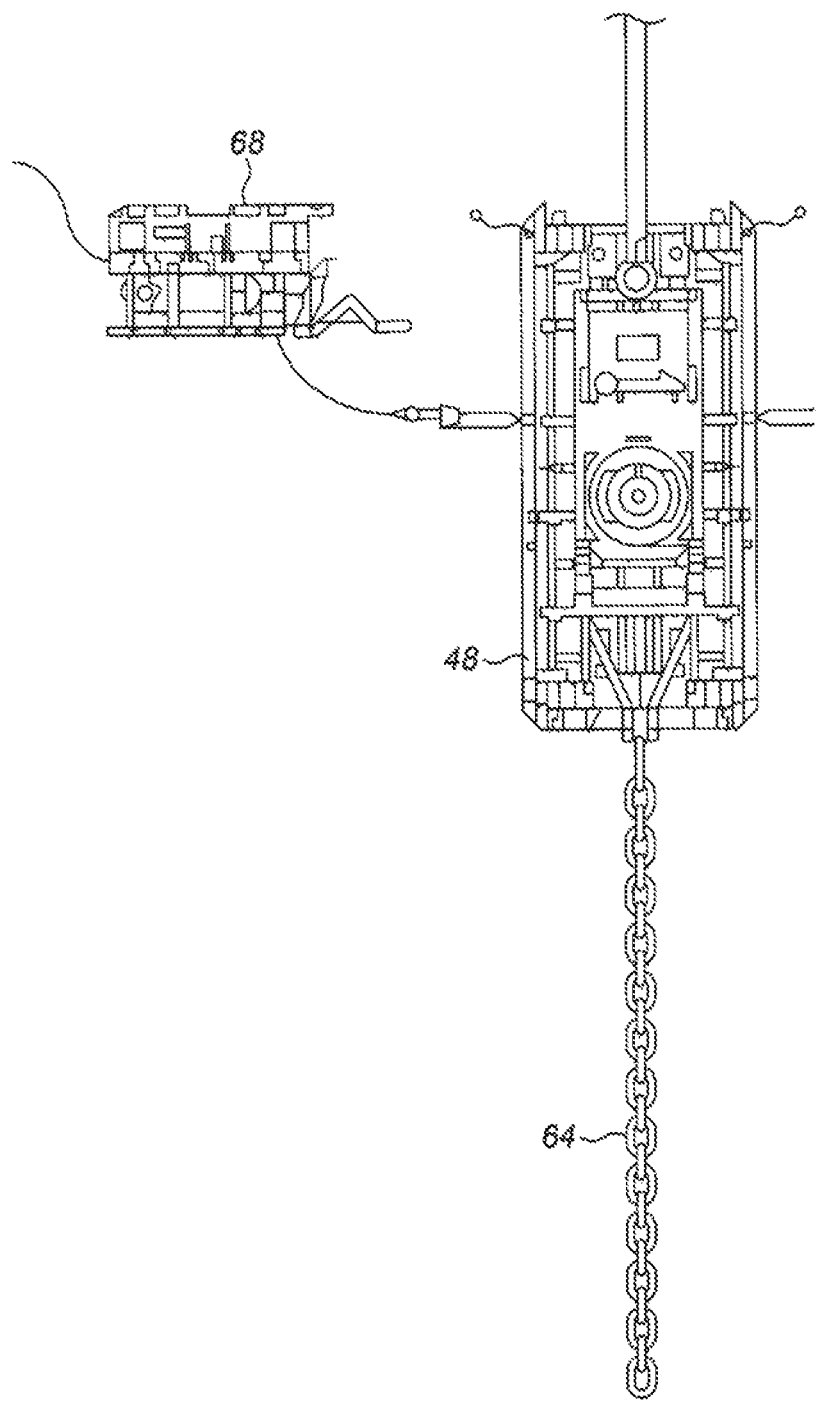
FIG. 14 is a front view of the terminal accessory and initiation chain of FIG. 13 suspended from the pipeline, now underwater in the water column between the surface and the seabed.

Turning finally to FIGS. 13 to 15, this sequence of drawings shows the PLET 48 being prepared for installation and then in the process of installation. Specifically, FIG. 13 shows the PLET 48 still in the workstation 20 suspended from the trailing end portion 16A of the pipeline 16 and in turn suspending the initiation line 64. Folded mudmat foundations 66 of the PLET 48 are evident in this view.

In FIG. 14, the PLET 48 is suspended in the water column being attended by an ROV (remotely operated vehicle) 68. In FIG. 15, the PLET 48 is approaching the seabed 70. With the assistance of the ROV 68, the initiation line 64 has been coupled to an anchor chain 72 of a subsea foundation exemplified by a suction pile 74. The initiation line 64 has been partially laid across the seabed 70 and the PLET 48 will soon also be landed on the seabed 70. This initiates laying of the pipeline 16 on the seabed 70.

Pipelaying then continues conventionally as the reel-lay vessel 12 follows the required pipelaying path at the surface and the unspooled and straightened pipeline 16 hangs as a catenary beneath the vessel 12 and remains pressurised. In-line accessories or fittings such as anodes, buoyancy and strakes can be fitted to, or incorporated into, the pipeline 16 at the workstation 20 as required.

When the required length of the pipeline 16 has passed through the workstation 20, the pipeline 16 is depressurised and cut. After welding a termination structure such as a PLET to the cut upper end of the lower section of the pipeline 16, the lower section is abandoned to the seabed 70 for subsequent connection and commissioning operations to be performed subsea.

Many variations are possible within the inventive concept. For example, if the lower section of the cut pipeline is a first pipeline and the upper section of the cut pipeline is the trailing end of a second pipeline that was spooled onto the reel sequentially before the first section, the above steps from FIG. 2 onwards may be repeated for the second pipeline.

If the pig 38 remains in the second pipeline, that pig 38 can be propelled toward a termination structure joined to the trailing end of the second pipeline, so as to expel air through the pressure cap of the termination structure as shown in FIG. 10. However like the pig 38 shown in FIGS. 6 and 7, a separate back-up pig may be inserted into the trailing end portion of the second pipeline before welding on the termination structure. This is as a contingency to prevent the water that remains within the second pipeline disrupting the welding process as explained above.

Where a back-up pig is used, the pig 38 can be propelled into contact with the back-up pig in the trailing end portion of the second pipeline so as to push the back-up pig against the pressure cap of the termination structure in a manner similar to that shown in FIG. 10. Thereafter, the pig 38 and the back-up pig can be propelled together back along the second pipeline in the manner of the pig 38 as described above with reference to FIG. 11. The pig 38 and the back-up pig could be latched together on first contact to keep them coupled together as a train as they travel together along the second pipeline thereafter.

The invention claimed is:

1. A method of joining a structure to a reeled pipeline, performed on board a reel-lay vessel to enable fluid communication between the pipeline and a conduit of the structure, the method comprising:
   suspending a trailing end portion of the pipeline in an upright orientation on a reel-lay tower of the vessel, the pipeline initially being substantially filled with a pressurising liquid under elevated pressure;
   depressurising the pressurising liquid in the pipeline;
   draining the pressurising liquid from the trailing end portion while retaining the pressurising; liquid in an inclined portion of the pipeline extending from the tower to a reel of the vessel, and in a spooled portion of the pipeline coiled on the reel;
   inserting a pig into the trailing end portion through a trailing end of the pipeline;
   joining the structure to the trailing, end of the pipeline; and
   pumping additional pressurising liquid into a leading end of the pipeline on the reel to flood the trailing end portion and to propel the pig from the trailing end portion into the conduit of the structure, thereby expelling through a port of the structure air that was trapped in the trailing end portion between the pig and the structure;
   followed by pumping additional pressurising liquid through the port and into the conduit of the structure to propel the pig toward the leading end of the pipeline.

2. The method of claim 1, comprising propelling the pig along the conduit and against a pressure cap of the structure that supports the port.

3. The method of claim 1, comprising applying suction of a pump to the port simultaneously with pumping additional pressurising liquid into the leading end of the pipeline.

4. The method of claim 1, comprising expelling through the leading end of the pipeline a quantity of pressurising liquid that is driven ahead of the pig.

5. The method of claim 4, comprising propelling the pig into the spooled portion of the pipeline coiled on the reel.

6. The method of claim 5, comprising subsequently unspooling the pipeline from the reel while the pig remains in the spooled portion of the pipeline.

7. The method of claim 6, comprising completing unspooling of the pipeline before the pig, passes the reel-lay tower.

8. The method of claim 7, comprising completing unspooling of the pipeline while the pig remains in the spooled portion of the pipeline.

9. The method of claim 1, comprising driving air ahead of the pig as the pig is propelled toward the leading end of the pipeline, which was trapped between the inclined portion of the pipeline and the pig in the trailing end portion of the pipeline.

10. The method of claim 9, comprising expelling through the leading end of the pipeline at least some of the air that is driven ahead of the pig.

11. The method of claim 1, comprising applying suction of a pump to the leading end of the pipeline simultaneously with pumping additional pressurising liquid through the port.

12. The method of claim 1, comprising inserting the pig into the trailing end portion to a level spaced upwardly from the trailing end.

13. The method of claim 1, followed by re-pressurising the pressurising liquid to the elevated pressure and lowering the structure from the vessel while unspooling the thus-pressurised pipeline from the reel.

14. The method of claim 13, comprising partially depressurising the pressurising liquid before cutting the pipeline.

15. The method of claim 14, comprising retaining the partially depressurised pressurising liquid with a retaining pig located in the trailing end portion above the trailing end.

16. The method of claim 15, comprising driving the retaining pig out of the trailing end by pumping additional pressurising liquid into the leading end of the pipeline under elevated pressure.

17. The method of claim 1, preceded by, cutting the pipeline beneath the trailing end portion to define the trailing end.

18. The method of claim 17, wherein the pipeline is a combination of sequentially spooled pipeline sections joined by a transition joint that is cut out to define the trailing end.

* * * * *